(12) United States Patent
Reese et al.

(10) Patent No.: US 8,327,154 B1
(45) Date of Patent: Dec. 4, 2012

(54) APPARATUS AND A METHOD TO CONFIGURE A PROGRAMMABLE DEVICE

(75) Inventors: Dirk A. Reese, Campbell, CA (US);
Paul B. Ekas, Redwood City, CA (US)

(73) Assignee: Altera Corporation, San Jose, CA (US)

( * ) Notice: Subject to any disclaimer, the term of this patent is extended or adjusted under 35 U.S.C. 154(b) by 41 days.

(21) Appl. No.: 13/097,918

(22) Filed: Apr. 29, 2011

(51) Int. Cl.
*G06F 11/30* (2006.01)
*H03K 19/177* (2006.01)

(52) U.S. Cl. .......... 713/187; 713/189; 713/193; 326/39; 326/8

(58) Field of Classification Search ................ 326/8–15, 326/38–40; 713/182, 187–190, 193, 194; 726/26, 34
See application file for complete search history.

(56) References Cited

U.S. PATENT DOCUMENTS

| | | | |
|---|---|---|---|
| 7,594,101 B2* | 9/2009 | Wuidart | 712/225 |
| 7,878,902 B2* | 2/2011 | Mattice et al. | 463/29 |
| 7,986,158 B2* | 7/2011 | Langton | 326/8 |
| 8,220,060 B1* | 7/2012 | Simkins | 726/26 |
| 2009/0091457 A1* | 4/2009 | Kresse et al. | 340/572.8 |
| 2011/0247085 A1* | 10/2011 | Liang et al. | 726/30 |

* cited by examiner

*Primary Examiner* — Vibol Tan
(74) *Attorney, Agent, or Firm* — Womble Carlyle Sandridge & Rice, LLP (57) ABSTRACT

A method to configure a programmable device is disclosed. The method includes receiving a scrambled configuration data at the programmable device. A bit sequence of a device tag that is stored in the programmable device is verified by determining whether the bit sequence of the device tag stored in the programmable device matches a bit sequence of a device tag within the scrambled configuration data. If the bit sequences match, the scrambled configuration data is transferred to a data re-formatter for descrambling. The descrambled configuration data is then transferred to a configuration memory of the programmable device. Circuitry that enables the method is also disclosed.

20 Claims, 5 Drawing Sheets

Using XOR encryption technique:

| | | |
|---|---|---|
| Configuration data (Prior to scrambling) | 01010111 01101001 01101011 01101001 | [420] |
| Scrambling Key | 11110011 11110011 11110011 11110011 | [425] |
| Scrambled data | 10100100 10011010 10011000 10011010 | [430] |

Decryption in re-formatter:

| | | |
|---|---|---|
| Scrambled data | 10100100 10011010 10011000 10011010 | [440] |
| Scrambling Key | 11110011 11110011 11110011 11110011 | [445] |
| Configuration data (after descrambling) | 01010111 01101001 01101011 01101001 | [450] |

APPARATUS AND A METHOD TO CONFIGURE A PROGRAMMABLE DEVICE

BACKGROUND

The grey market is the trade of a commodity through a distribution channel that is unofficial, unauthorized, or unintended by an original manufacturer. A typical grey market activity under the goods category occurs when the goods are sold through an unauthorized distribution channel. The unauthorized distribution channel may have no relationship with the original producer. The grey market is common for electronic equipment such as cellular phones, cameras, etc. In addition, semiconductor industry products are commonly distributed through grey markets.

One of the common integrated circuits (ICs) that have become the product of trade in the grey market is programmable devices. The programmable devices are an electronic component capable of reconfiguring and building digital circuits. The programmable devices include Programmable Array Logics (PALs), Generic Array Logics (GALs), Complex Programmable Logic Devices (CPLDs), Field Programmable Gate Arrays (FPGAs) and others. Typically, a full functionally enabled programmable device costs more than a restricted functionally enabled programmable device. The unauthorized distributer of the grey market may hack the restricted functionally enabled programmable device so that the programmable device becomes fully enabled. The hacked programmable device is sold at a lower cost, which affects the profit of the programmable device manufacturer.

There are many methods that have been used in a programmable device to provide security features to restrict or avoid the grey market activities. One such method is providing a device tag to the programmable devices, hence restricting the programmable devices to vendor selected tools. But such techniques have been circumvented by the unauthorized dealers of the grey market.

It is within this context that the embodiments described herein arise.

SUMMARY

Embodiments described herein provide a method to configure a programmable device and circuits that enable the method. It is appreciated that the present embodiments can be implemented in numerous ways, such as a process, an apparatus, a system, a device, or a method. Several embodiments of the present invention are described below.

In one embodiment, a method to configure a programmable device is provided. The method includes receiving scrambled configuration data at the programmable device. The scrambled configuration data may be unique to each programmable device. A bit sequence of a device tag that is stored in the programmable device is verified by comparing it to a bit sequence of a device tag within the scrambled configuration data. If the bit sequence matches, the scrambled configuration data is transferred to a data re-formatter. The scrambled configuration data is descrambled utilizing the bit sequence of the device tag of the programmable device, wherein the bit sequence of the device tag of the programmable device is a descrambling key. The descrambled configuration data is then transferred to a configuration memory of the programmable device.

In another embodiment, circuitry within the programmable device that enables the method is provided. The circuitry includes a set of fuses where the fuse settings are unique to each programmable device. The circuitry also includes a comparator that is coupled to the set of fuses and to external data. The comparator compares a bit sequence of a device tag embedded within the external data and a device tag generated by the set of fuses. The circuitry includes a multiplexer for receiving the external data and an output of the comparator. The circuitry has a data re-formatter that is coupled to the multiplexer and the set of fuses. The data re-formatter receives an output of the multiplexer and reformats the output of the multiplexer according to the fuse settings provided by the set of fuses if there is a match between the two compared tags.

Other aspects of the will become apparent from the following detailed description, taken in conjunction with the accompanying drawings, illustrating by way of example of the principle of the embodiments.

BRIEF DESCRIPTION OF THE DRAWINGS

The embodiments may be understood by reference to the following description taken in conjunction with the accompanying drawings.

DETAILED DESCRIPTION

The following embodiments describe a method and circuitry that configures a programmable device. It is appreciated, that the present invention may be practiced without some or all of these specific details. In other instances, well-known operations have not been described in detail in order not to unnecessarily obscure the present invention.

Embodiments described below provide for a method to configure a programmable device. The exemplary method described herein includes an additional level of security for grey market protection. The method includes transferring a unique data file to the programmable device. The method prevents successful descrambling of the scrambled configuration data through the security features described herein. The security features utilize a descrambling key embedded within the programmable device to descramble the scrambled configuration data. The embodiments also include circuitry to enable the exemplary method.

Figure 1:
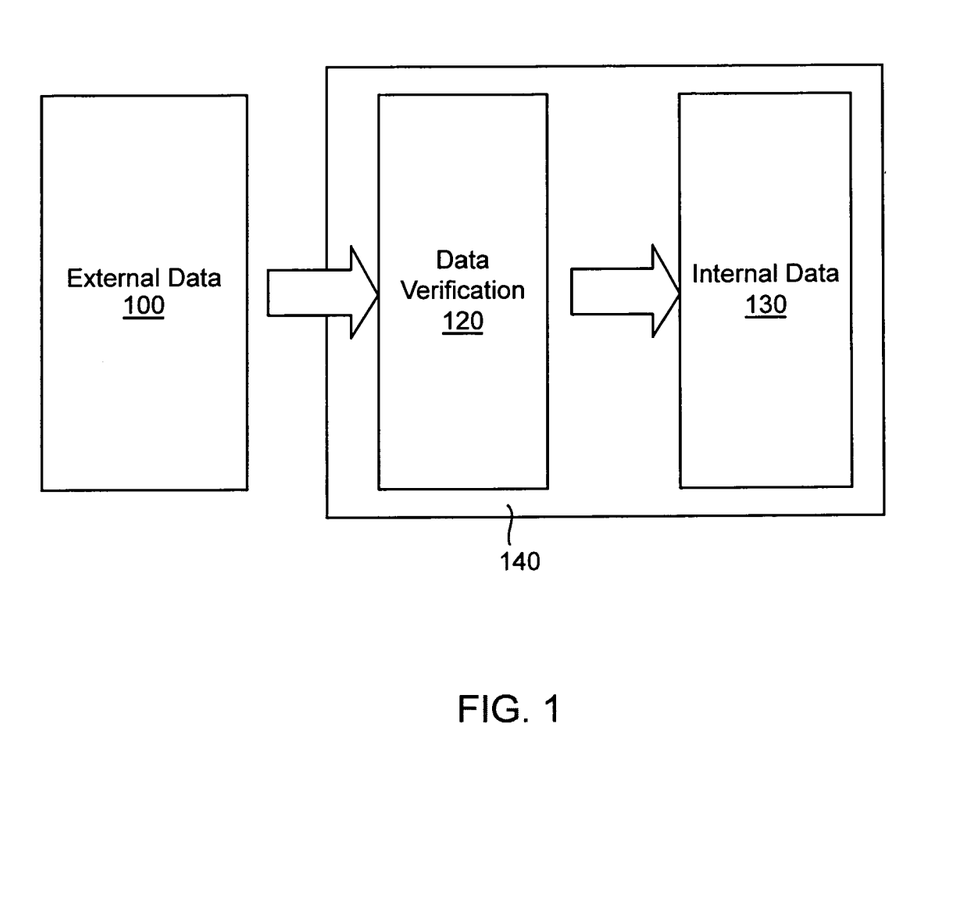
FIG. 1, meant to be illustrative and not limiting, illustrates a system to configure a programmable device in accordance with one embodiment.

FIG. 1, meant to be illustrative and not limiting, illustrates a system to configure a programmable device. The system includes external data 100 and a programmable device 140. The external data 100 contains information that configures the programmable devices 140 to a specific design or to trigger the programmable device 140 to execute a task, to name a few. The information embodied in the external data 100 could be in the form of binary or source code in one embodiment. If the data is in the form of source code, the source code will be transformed into the binary form or a machine readable form before transmission to the programmable device 140. The external data 100 could be an external memory, a computing device, a hard disk drive, or some other suitable storage medium. In one embodiment, the external data 100 contains the information that is generated by an Electronic Design Automation (EDA) tool that programs the programmable device 140. In another embodiment, the information stored in the external data 100 is the configuration data for programmable device 140.

The programmable device 140 of FIG. 1 includes data verification circuitry 120 and internal data circuitry 130. The data verification circuitry 120 verifies whether the received data is valid and is in proper form before sending the data to the internal data circuitry 130, and hence secures the programmable device 140 from unauthorized uses. The internal data circuitry 130 is typically core circuitries of the programmable device 140. In one embodiment, the internal data circuitry 130 includes an array of a configuration memory that configures the programmable device 140 to a specific design functionality based on the configuration data.

In one embodiment, the external data 100 is stored with the configuration data to configure the internal data circuitry 130 of the programmable device 140. The external data 100 provides the information, i.e., a bit sequence, to the data verification circuitry 120 of the programmable device 140. The data verification circuitry 120 verifies the information and transfers the information to the internal data circuitry 130 where the information is further processed. In one embodiment, the internal data circuitry 130 will solely be able to receive the information from a fixed external data 100. Whether or not the internal data circuitry 130 receives the information from the fixed external data 100 may be determined by a vendor of the programmable device 140. It is appreciated that the transfer of the information from the external data 100 to the programmable device 140 need not be limited to a specific communication standard. It is further appreciated that the information may also flow from the internal data circuitry 130 back to the external data 100 and pass through the data verification circuitry 120 in one embodiment (not shown).

Figure 2:
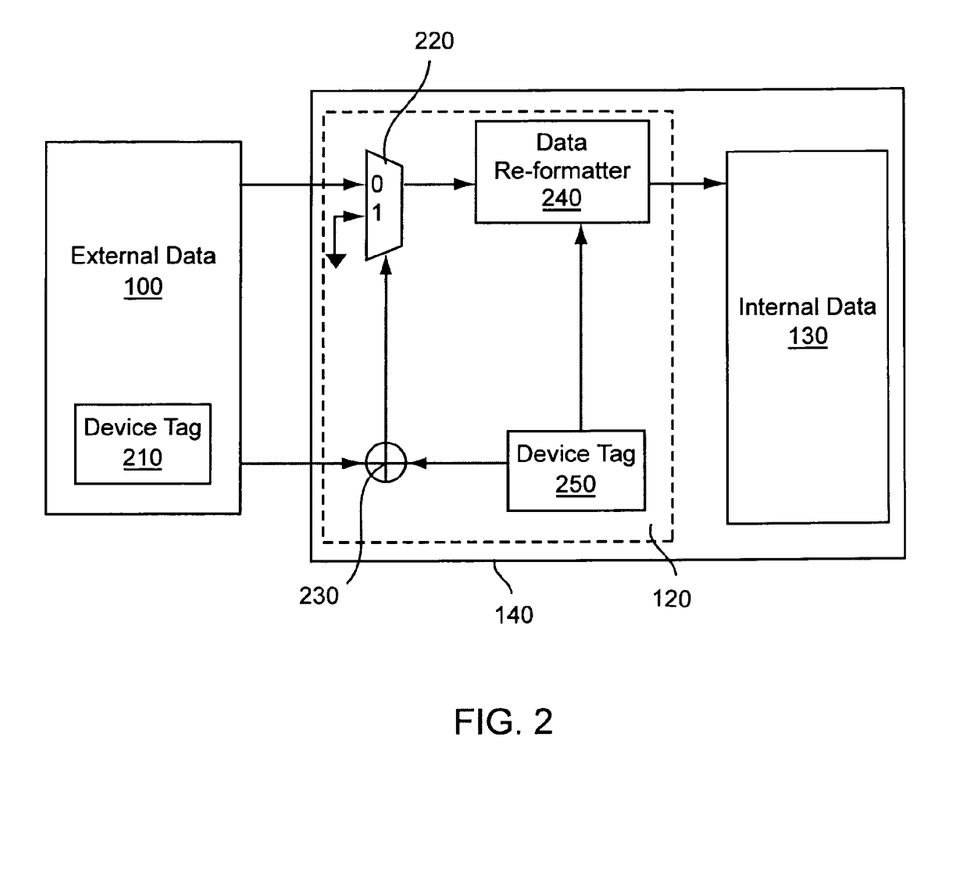
FIG. 2, meant to be illustrative and not limiting, illustrates details of a data verification circuit in accordance with one embodiment.

FIG. 2, meant to be illustrative and not limiting, illustrates details of the data verification circuitry 120. The data verification circuitry 120 includes a multiplexer 220, a data re-formatter 240, a device tag 250 and a comparator 230. The external data 100 further includes a device tag 210. In one embodiment, a bit sequence in the device tag 210 is utilized to scramble the data that will eventually be transmitted from the external data 100 to the programmable device 140. In one embodiment, the bit sequence within the device tag 210 is unique to the external data 100 and the programmable device 140. The bit sequence of the device tag 210, which is incorporated within the scrambled data that may be transmitted from the external data 100 to the programmable device 140, controls and restricts the utilization of the information within the external data 100 to a vendor specified programmable device 140. The control provided by the bit sequence of the device tag 210 secures the integrated circuit against any unauthorized activity by disabling operability of the programmable device 140.

In one embodiment, an XOR scrambling technique is utilized to scramble data being transmitted from the external data 100. It is appreciated that the data being transmitted may be configuration information. It is further appreciated that the transmission of configuration information described throughout the embodiments is merely illustrative and not intended to limit the scope of the present invention. Configuration information that the EDA tool generates is scrambled through a logical operation, such as an XOR operation utilizing the bit sequence stored in the device tag 210, as mentioned above. In alternative embodiments, either an Advanced Encryption Standard (AES) or some other random encryption standard scheme may be utilized together with the bit sequence of the device tag 210 as the scrambling key for the configuration data. In one embodiment, the device tag 210 is embedded within the scrambled configuration information or appended to the scrambled configuration information. It is appreciated that the scrambled configuration information is derived from scrambling the configuration information with the bit sequence of device tag 210 as the scrambling key in one embodiment.

Still referring to FIG. 2, the external data 100 is coupled to the multiplexer 220 and the comparator 230 of the data verification circuitry 120. The multiplexer 220 is also coupled to an output from the comparator 230. The comparator's output value controls the multiplexer 220 to transfer the information obtained from the external data 100 or to transfer a noise signal. In one embodiment, the noise signal may be a grounded signal. The multiplexer 220 couples the information from the external data 100 or the noise signal to the data re-formatter 240.

The comparator 230 has two inputs. The first input is from the bit sequence of the device tag 210 that transmitted with the scrambled configuration information from the external data 100. The second input is a bit sequence of the device tag 250. The output from the comparator 230 is transferred to the multiplexer 220. The comparator 230 compares the first input to the second input to determine if the two bit sequences match. If the two bit sequences do not match, the transfer of the scrambled configuration information from the external data 100 to the data verification circuitry 120 is prevented. In one embodiment, useless information, e.g., a noise signal, may be transferred from the multiplexer 220 to the data verification circuitry 120 in response to a mismatch between the device tags 210 and 250. In one embodiment, the output of the comparator 230 is a logical zero when the device tag 210 matches the device tag 250, permitting the information from the external data 100 to be transferred to the data re-formatter 240. In another embodiment, the output of the comparator 230 is a logical one when the device tag 210 does not match the device tag 250, thereby transferring the noise signal to the data re-formatter 240.

In one embodiment, the comparator 230 is an XOR gate. In this embodiment, the bit sequence from the device tag 210 is logically XOR'ed with the bit sequence from the device tag 250. If there is a logical difference detected between the bit sequences, the XOR gate will output a logical one. When the bit sequences match, the XOR gate will output a logical zero.

Still referring to FIG. 2, the device tag 250 is coupled to the comparator 230 and the data re-formatter 240. The bit sequence of the device tag 250 may be used as a key for scrambling, descrambling or reformatting. In one embodiment, the bit sequence of the device tag 250 is generated by a set of fuses that may be unique to each programmable device 140. The bit sequence is generated through the unique configuration of the set of fuses contained in the device tag 250. In another embodiment, the device tag 250 is a storage element, such as non-volatile memory, that stores the unique bit sequence. The bit sequence from the device tag 210 and the bit sequence from the device tag 250 must match in order for programmable device 140 to receive the configuration information to function properly.

Still referring to FIG. 2, the data re-formatter 240 receives the output of the multiplexer 220, which is either the information from the external data 100 or the noise. The data re-formatter 240 also receives the bit sequence from the device tag 250. The data re-formatter 240 descrambles either the information or the noise according to the bit sequence received from the device tag 250.

In one embodiment, the descrambling technique utilized may be one of an XOR cipher, an AES, or random decryption schemes. The data re-formatter 240 descrambles the information and transfers the information to the internal data circuitries 130. The bit sequence of the device tag 210 is the key utilized for scrambling the information stored within the external data 100. In the grey market, the bit sequence of the device tag 210 may be hacked in order to match the bit sequence of the device tag 250. Such hacking then enables information stored within the external data 100 to be utilized for configuring the programmable devices 140. This hacking does not limit the programmable device 140 to be restricted by the vendor of the programmable device 140. However in the embodiments described herein, the information is scrambled in the external data 100 and the hacker does not have access to the bit sequence of the device tag 210, i.e., the key to unscramble the information. If a hacker attempts to descramble the scrambled information, the multiplexer 220 outputs a noise signal instead of the scrambled signal. Moreover, the data re-formatter 240 will be unable to descramble the scrambled information because of a mismatch between the bit sequences of the device tag 250 and 210.

Figure 3:
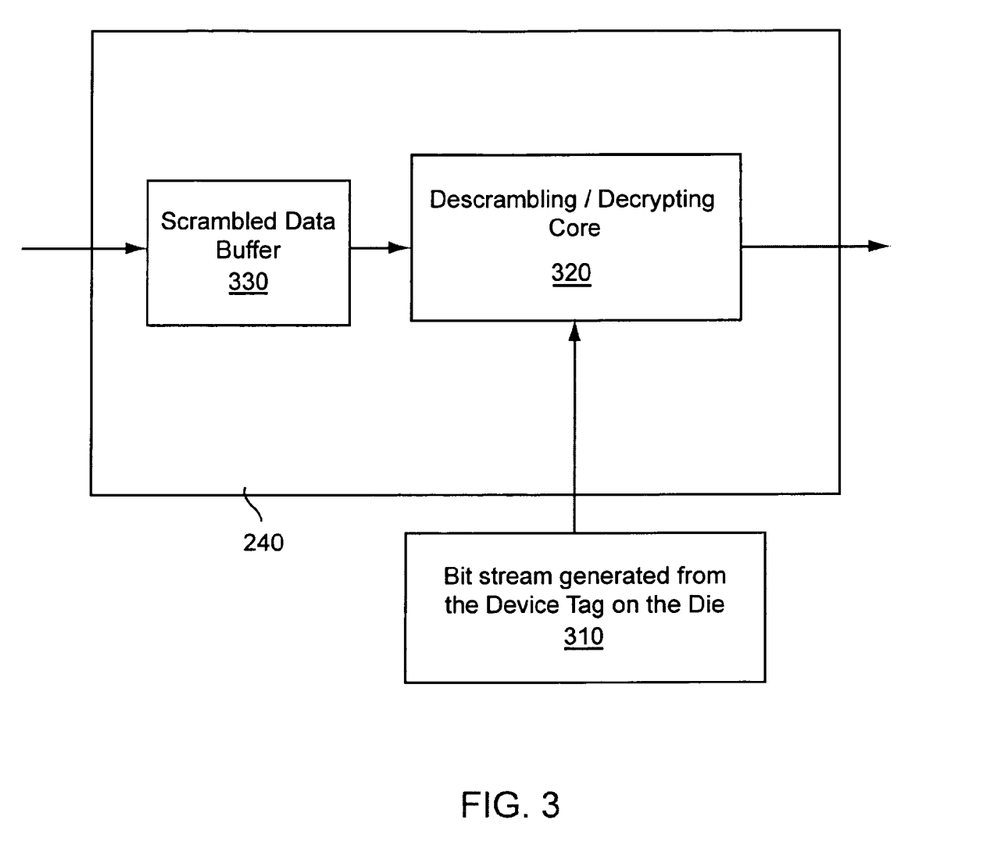
FIG. 3, meant to be illustrative and not limiting, illustrates details of a data re-formatter in accordance with one embodiment.

FIG. 3, meant to be illustrative and not limiting, illustrates details of the data re-formatter 240. The data re-formatter 240 as described in FIG. 2 receives data from two sources. The first source is from the multiplexer 220 and the second is from the device tag 250, both as illustrated in FIG. 2. The data re-formatter 240 includes a scrambled data buffer 330 and a descrambling/decrypting core 320.

The data transferred from the multiplexer 220 is stored in the scrambled data buffer 330 temporarily. The method of transferring data from the scrambled data buffer 330 to the descrambling/decrypting core 320 is based on a type of a descrambling technique. In one embodiment, when an XOR encryption is utilized, the data is a bit sequence and is transferred sequentially to the descrambling core. In another embodiment, data is transferred back and forth in an iterative process from the scramble data buffer 330 to the descrambling/decrypting core 320 if an AES decryption scheme is used.

It is appreciated that the process for the AES decryption requires a storage buffer large enough to handle this processing, such as scrambled data buffer 330. The descrambling/decrypting core 320 receives data from the scrambled data buffer 330 and receives a bit sequence generated from the device tag on die 310. The descrambling/decrypting core 320 descrambles the data received from the scrambled data buffer 330.

In one embodiment, the descrambling/decrypting core 320 includes a plurality of XOR gates arranged in parallel for XOR descrambling. Each of the XOR gates receive one bit from scrambled data buffer 330 and another bit from the bit sequence generated from the device tag on the die 310. In another embodiment, the descrambling/decrypting core 320 includes specialized circuitry that performs AES processes, such as AddRoundKey, SubBytes, ShiftRows, MixColumns, etc.

It is appreciated that the functionality of each of the AES processes and details thereof are not disclosed in order not to obscure the embodiments. On the programmable device 140, as illustrated in FIGS. 1 and 2, the descrambling/decrypting core 320 can be either a hard block core or a soft block core. The hard block core is typically circuitry that is fixed once the programmable device 140 is designed. The soft block core is typically circuitry that is configured during the transfer of the scrambled configuration data. The soft block core provides additional security because the soft block core can vary the encryption/decryption schemes whenever the programmable device 140 is configured, e.g., first round of configuration data utilizes the XOR cipher encryption/decryption schemes whereas the second round of configuration may use AES encryption/decryption schemes. This provides an additional level of security since the schemes are not fixed.

Figure 4:
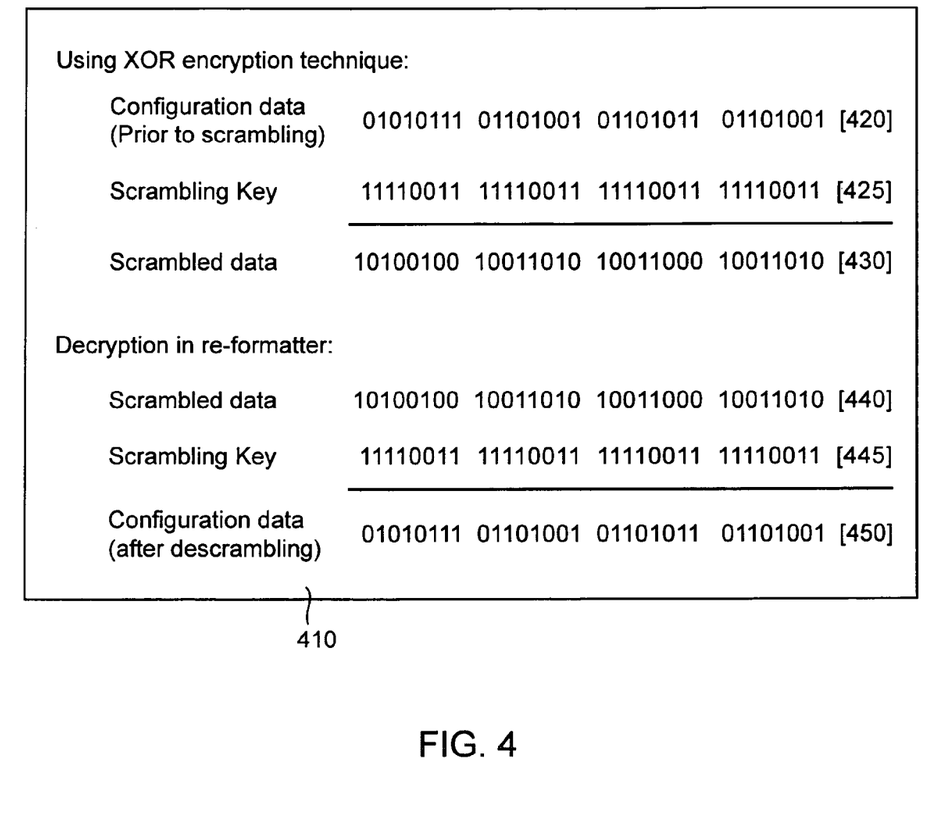
FIG. 4, meant to be illustrative and not limiting, illustrates encryption and decryption of information in accordance with one embodiment.

FIG. 4, meant to be illustrative and not limiting, illustrates encryption and decryption of the configuration information. The table 410 shows the encryption of the information externally and decryption of the information internally utilizing XOR cipher. The information prior to being scrambled is represented by a binary sequence 420 that is logically XOR-ed with a scrambling key that is represented by a binary sequence 425. For example, $0^{th}$ bit of binary sequence 420 that is 1 will be XOR-ed with $0^{th}$ bit of the binary sequence 425 of the scrambling key that is also 1. The XOR result, which is also scrambled data, will have $0^{th}$ bit of 0. A $1^{st}$ bit of information that is 0 will be XOR-ed with $1^{st}$ bit of the key that is 1. A $1^{st}$ bit of scrambled data will be 1. The XOR-ing in this manner continues for the remaining bits. The outcome is represented by binary sequence 430 which is stored in external data 100.

The scrambled data of the binary sequence 430 is transferred to data re-formatter 240, after being transferred through the multiplexer 220, as illustrated in FIGS. 2 and 3. The scrambled data is descrambled utilizing a descrambling key generated by the device tag 250 as illustrated in FIG. 2. In this exemplary embodiment, the descrambling key is identical to the scrambling key. The scrambled data represented by binary sequence 440 is XOR-ed with the descrambling key represented by binary sequence 445. The result of the XOR operation is the information represented by binary sequence 450. It is appreciated that when the scrambling key and descrambling key are not identical, the descrambled information resulting from the different keys is different, which render the integrated circuit inoperable for its intended purpose.

Figure 5:
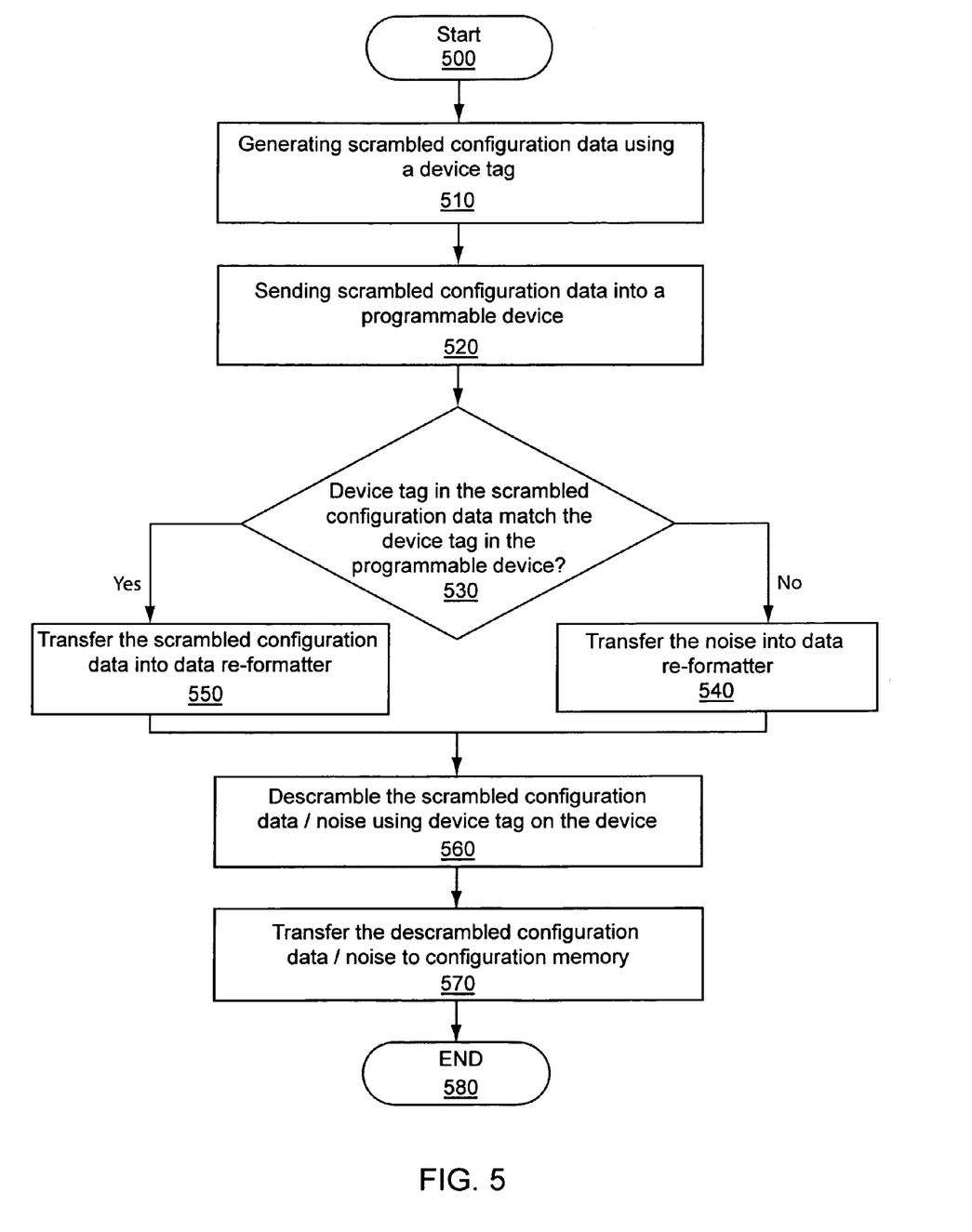
FIG. 5, meant to be illustrative and not limiting, illustrates a flowchart of a method to configure a programmable device in accordance with one embodiment.

FIG. 5, meant to be illustrative and not limiting, illustrates a flowchart of a method to configure the programmable device. The flowchart includes generating a scrambled configuration data using a bit sequence of a device tag as in operation 510. The scrambled configuration data is scrambled utilizing an XOR cipher, an AES scheme, or a random encryption scheme, etc. The bit sequence of the device tag is used as a scrambling key. The scrambled configuration data is stored in the external data 100 as illustrated in the FIGS. 1 and 2. In one embodiment, the bit sequence of the device tag is embedded or appended together with the scrambled configuration data.

Next, the scrambled configuration data and embedded bit sequence of the device tag are transferred to the programmable device as illustrated in operation 520. At step 530, the bit sequence of the device tag that was used as the scrambling key is compared to unique bit sequence of a device tag within the programmable device. At step 540, the data re-formatter receives noise if there is mismatch between the bit sequences. At step 550, the scrambled configuration data is transmitted to the data re-formatter if there is a match between the compared bit sequences.

At step 560, the scrambled configuration data or noise is descrambled utilizing the device tag within the programmable device as a descrambling key. The descrambling scheme may be an XOR cipher, an AES scheme, or other suitable random decryption scheme. The configuration data is successfully recovered after descrambling if the bit sequences of the device tags match. At step 570, the configuration data is stored a configuration memory in order to configure the programmable device.

The embodiments, thus far, were described with respect to integrated circuits. The method and apparatus described herein may be incorporated into any suitable circuit. For example, the method and apparatus may be incorporated into numerous types of devices such as microprocessor or programmable logic devices. Exemplary of programmable logic devices include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just name a few.

The programmable logic device described herein may be part of a data processing system that includes one or more of the following components; a processor; memory; IO circuits; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method of operations were described in a specific order, it should be understood that other operation may be performed in between described operations, described operations may be adjusted so that they occur at slightly different times or described operations may be distributed in a system which allows occurrence of the processing operation at various intervals associated with the processing, as long as the processing of the overlay operations are performed in a desired way.

Although the foregoing invention has been described in some detail for the purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of configuring a programmable device, the method comprising:
   receiving scrambled configuration data at the programmable device, wherein the scrambled configuration data is unique to the programmable device;
   verifying whether a bit sequence of a device tag within the programmable device matches a bit sequence of a device tag within the scrambled configuration data;
   transferring the scrambled configuration data to a data re-formatter in response to a match between the bit sequence of the device tag within the programmable device and the bit sequence of the device tag within the scrambled configuration data;
   descrambling the scrambled configuration data, at the data re-formatter, utilizing the device tag on the programmable device to form a descrambled configuration data; and
   storing the descrambled configuration data in configuration memory of the programmable device.

2. The method in claim 1, wherein descrambling utilizes one of XOR ciphers, Advanced Encryption Standards (AESs) or random encryption schemes.

3. The method in claim 1, wherein the bit sequence of the device tag on the programmable device is generated from fuses within the programmable device.

4. The method in claim 1, wherein said verifying comprises:
   comparing the bit sequence of the device tag within the programmable device to the bit sequence of the device tag within the scrambled configuration data; and
   generating an output based on the comparing.

5. The method in claim 1, wherein the bit sequence of the device tag within the programmable device and the bit sequence of the device tag within the scrambled configuration data are unique to the programmable device.

6. The method in claim 1 further comprising:
   storing the scrambled configuration data in an external data storage; and
   transmitting the scrambled configuration data stored in the external data storage to a multiplexer of the programmable device.

7. The method in claim 1, wherein each operation is embodied as computer code on a computer readable storage medium.

8. A method to configure a programmable Integrated Circuit (IC) comprising:
   receiving configuration data from an external source at the programmable IC;
   verifying whether a bit sequence of a device tag embedded in the configuration data matches a bit sequence of a device tag within the programmable IC;
   outputting the configuration data to a data re-formatter in response to a match between the bit sequence of the device tag embedded in the configuration data and the bit sequence of the device tag within the programmable IC, wherein the configuration data is re-formatted according to the bit sequence of the device tag within the programmable IC to form a reformatted configuration data; and
   loading the reformatted configuration data in a memory of the programmable IC.

9. The method in claim 8 further comprising:
   comparing the bit sequence of the device tag within the configuration data with the bit sequence of the device tag within the programmable IC; and
   responsive to said comparing, outputting one of configuration data or noise through a multiplexer.

10. The method in claim 8, wherein the configuration data is generated utilizing electronic design automation (EDA) software.

11. The method in claim 8, wherein the configuration data is generated utilizing one of XOR ciphers, Advanced Encryption Standards (AESs) or random encryption schemes.

12. The method in claim 8, wherein the bit sequence of the device tag of the programmable IC is generated from a set of fuses.

13. The method in claim 8, wherein the configuration data stored at the external source is encrypted, and wherein the bit sequence of the device tag is appended to the encrypted configuration data.

14. The method in claim 9, wherein the multiplexer outputs noise responsive to a mismatch between the bit sequence of the device tag within the configuration data and the bit sequence of the device tag within the programmable IC.

15. An integrated circuit (IC) comprising:
   fuses operable to provide a first device tag unique to the IC;
   a comparator coupled to the fuses and operable to receive external data, wherein the comparator is operable to compare a bit sequence of a second device tag within the external data to a bit sequence of the first device tag;
   a multiplexer operable to receive the external data and a result of a comparison by the comparator; and
   a data re-formatter operable to receive output of the multiplexer, wherein the data re-formatter is operable to re-format the output of the multiplexer according to the bit sequence of the first device tag.

16. The IC in claim 15, wherein the first device tag is a key in compliance with one of XOR ciphers or encryption schemes.

17. The IC in claim 15 further comprising:
   a memory coupled to the data re-formatter, wherein said memory is operable to store the reformatted output of the multiplexer.

18. The IC in claim 15, wherein the external data is stored in a memory component, wherein the external data comprises scrambled configuration bit sequence for the IC.

19. The IC in claim 18, wherein the multiplexer responsive to the result of the comparison is operable to transfer either the scrambled configuration bit sequence or a noise signal.

20. The IC in claim 15, wherein the IC is a programmable logic device.

* * * * *